(12) United States Patent
Ghaisas et al.

(10) Patent No.: US 9,972,016 B2
(45) Date of Patent: May 15, 2018

(54) SYSTEMS AND METHODS FOR AN AUTOMATED INTERPRETATION OF LEGAL REGULATIONS

(71) Applicant: Tata Consultancy Services Limited, Mumbai (IN)

(72) Inventors: Smita Ghaisas, Pune (IN); Manish Motwani, Pune (IN); Preethu Rose Anish, Pune (IN); Balaji Balasubramaniam, Pune (IN); Aarthy Krishnamurthy, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 763 days.

(21) Appl. No.: 14/550,420

(22) Filed: Nov. 21, 2014

(65) Prior Publication Data
US 2015/0142682 A1 May 21, 2015

(30) Foreign Application Priority Data
Nov. 21, 2013 (IN) .......................... 3662/MUM/2013

(51) Int. Cl.
*G06Q 30/00* (2012.01)
*G06F 17/30* (2006.01)

(52) U.S. Cl.
CPC ..... *G06Q 30/018* (2013.01); *G06F 17/30598* (2013.01)

(58) Field of Classification Search
None
See application file for complete search history.

(56) References Cited

U.S. PATENT DOCUMENTS

| 2006/0259420 A1* | 11/2006 | Schaffer | G06Q 20/10 705/39 |
| 2007/0180490 A1* | 8/2007 | Renzi | G06F 21/577 726/1 |
| 2011/0145885 A1* | 6/2011 | Rivers | G06Q 10/06 726/1 |

OTHER PUBLICATIONS

Fikes et al., The Role of Frame-Based Representation in Reasoning, 1985, Communications of the ACM, vol. 28, No. 9, pp. 904-920.*
Fox et al., Experiences with SRL: an analysis of a frame-based knowledge representation, 1985, Carnegi-Mellon University, 20 pages total.*
"Regulatory Compliance Demystified: An Introduction to Compliance for Developers", Security Innovation, Inc., Mar. 2006, uploaded Nov. 21, 2014 http://msdn.microsoft.com/en-us/enus/library/aa480484.aspx, (Mar. 2006), 9 pgs.

(Continued)

*Primary Examiner* — Alan S Chen
(74) *Attorney, Agent, or Firm* — Schwegman Lundberg & Woessner, P.A.

(57) ABSTRACT

Systems and methods for automated interpretation of legal regulations are described. The described systems implement a method that includes receiving a plurality of legal regulations and deconstructing the plurality of legal regulations based on at least one of a regulatory rule model and Minsky's frames to form a computer interpretable regulation repository. The method also includes identifying rule intents applicable to each of the deconstructed plurality of legal regulations; and classifying the plurality of legal regulations into at least one rule act based at least on the identified rule intents.

14 Claims, 3 Drawing Sheets

(56) References Cited

OTHER PUBLICATIONS

Breaux, Travis D., et al., "Legal Requirements, Compliance and Practice: An Industry Case Study in Accessibility", In proceedings of 17th Requirements Engineering Conference, pp. 43-52, 2008, (2008), 43-52.

Dearing, D. P., "OpenNLP Part-of-Speech (POS) Tags: Penn English Treebank", uploaded Nov. 21, 2014: http://blog.dpdearing.com/2011/12/opennip-part-of-speech-pos-tags-penn-english-treebank; written Dec. 28, 2011, (Dec. 8, 2011), 6 pgs.

Ghaisas, Smita, et al., "Detecting System Use Cases and Validations from Documents", Proceedings of the 24th IEEE/ACM International conference on Automated software Engineering (ASE 2013), pp. 568-573, (2013), 568-573.

Lintean, Mihai, et al., "Measuring Semantic Similarity in Short Texts through Greedy Pairing and Word Semantics", Proceedings of the Twenty-Fifth International Florida Artificial Intelligence Research Society Conference, Marco Island, FL, 2012, (2012), 244-249.

Maxwell, Jeremy C., et al., "The Production Rule Framework: Developing a Canonical Set of Software Requirements for Compliance with the Law", Proceedings of the 1st ACM International Health Informatics Symposium, Nov. 11-12, 2010, Arlington, Virginia, USA, (Nov. 11, 2010), 8 pgs.

Xiao, Xusheng, et al., "Automated Extraction of Security Policies from Natural-Language Software Documents", Proceedings of the 20th International Symposium on Foundations of Software Engineering (FSE), 2012, pp. 12:1-12:11, (2012), 12:1-12:11.

\* cited by examiner

SYSTEMS AND METHODS FOR AN AUTOMATED INTERPRETATION OF LEGAL REGULATIONS

TECHNICAL FIELD

The present subject matter relates, in general, to legal regulation interpretation, and, in particular, to automated interpretation of legal regulations.

BACKGROUND

Over the past several years, software has taken an increasingly important role in the efficient execution of several types of business processes. Businesses have adopted Information Technology (IT) for automation from early stages of computing. With increasing use of software application in various fields of business, legal regulations have been imposed by various jurisdictions on software systems and application to ensure reliability of the software systems. The legal regulations imposed by different jurisdictions vary in scope and include separate requirements which may depend on the local laws and prevalent systems of the jurisdiction.

Companies must ensure their software complies with relevant regulations to avoid risk of Cost penalties. An even greater risk is that of damage to the credibility of and organization. Regulations are complex to understand because they use a certain legal terminology. Generally, there is a mismatch between legal and software community vocabularies. Therefore, there is a need to interpret regulations in terms of implementation specifics so that software developers can understand what they imply in terms of building compliant systems.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example only, and with reference to the accompanying figure(s), in which.

Figure 1:
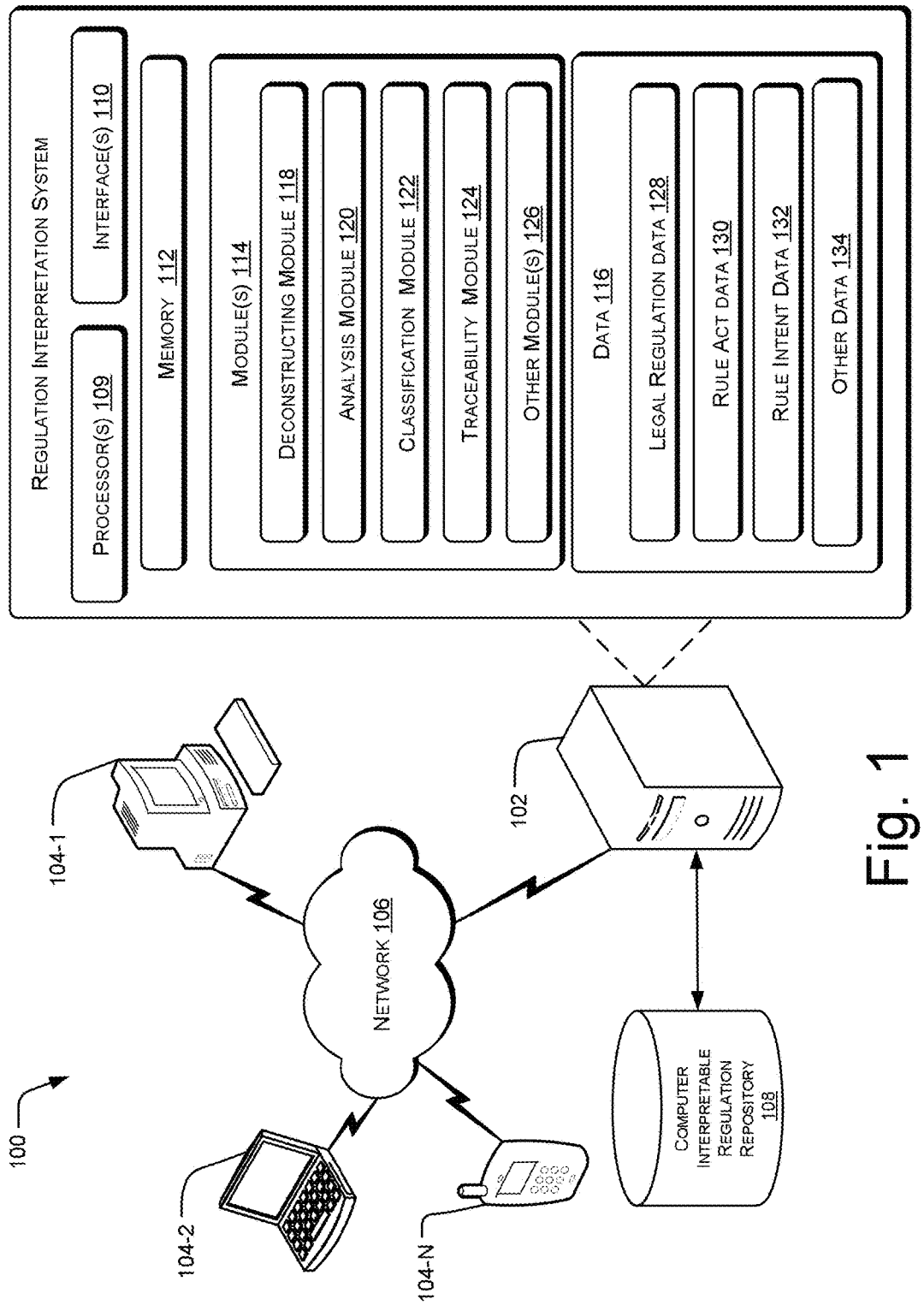
FIG. 1 illustrates a network environment implementing a regulation interpretation system, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods for automated interpretation of legal regulations and their compliance in applications and software are described. Further, such systems and methods can trace the implications of legal regulations to requirements while designing and developing the Information Technology (IT) systems. As a result, the systems and methods facilitate regulatory compliance by interpreting the legal regulations in terms of implementation specifics that software developers understand and can use while building Information Technology (IT) systems. The systems and methods can be implemented in a variety of computing devices. The computing devices that can implement the described method(s) include, but are not limited to, desktop computers, hand-held devices, laptops or other portable computers, mobile phones, landline phones, and the like. Although the description herein is with reference to certain computing systems, the systems and methods may be implemented in other devices, albeit with a few variations, as will be understood by a person skilled in the art.

Applications and software systems are a pervasive element in most products and processes, and over time, its sources have multiplied. Sources include internal development, suppliers of sub-systems and chips, outsourced contractors, open source repositories and the previous work of the developers themselves.

Legal requirements and restrictions for businesses have also developed over time which have now become stricter and compliance to which is almost un-avoidable. Legal systems are traditionally expressed in natural language. Businesses today implement their processes through software applications. Such software applications are necessitated to incorporate the legal requirements and restrictions as they mirror the way business is conducted through the business processes.

Software vendors have to ensure that the systems they deliver comply with laws of the land as captured in country-specific regulations. Large software projects often have contractual Service Level Agreements (SLAs) that mandate this assurance. It is however a tedious task to read and interpret the legal terminology in large regulatory documents and determine validations to be implemented in the software systems. A single regulatory statement may imply multiple validations such as access control, data validation, and conditional process execution; and all of these are required to be implemented for meeting the SLAs. Therefore, organizations have to spend tremendous time and efforts in manually interpreting and complying with relevant legal regulations to avoid the risk of legal actions and costly penalties.

Organizations strive to correctly interpret legal requirements and perform regular legal compliance checks. Since regulations are complex to understand due to use of legal terminology and, there exists a mismatch between legal and software community vocabularies, interpretation of legal requirements into formalized language which is understandable by software developers, researchers, and engineers is a challenge. Therefore, organizations generally rely on legal experts for the interpretation of the legal regulations. However, involving legal experts in the process makes the process time consuming and expensive.

Therefore, organizations face a challenge of determining applicable laws, understanding interdependencies of domain and jurisdiction, extraction of legal requirements, validation of the extracted requirements for consistency and compliance, interpretation of the validated requirements in software adaptable requisites, and implementation of the legal requirements in building software architecture.

According to an implementation of the present subject matter, systems and methods to automatically interpret legal regulations are described. The interpretation of the legal regulations allows software developers to understand as to what such legal requirements imply in terms of building compliant systems. Further, the described systems and methods automate interpretation of the legal regulations and allows tracing of such legal regulations to software requirements to allow building of legally compliant software.

In one implementation of the present subject matter, the systems and methods propose an automated text to model transformation.

Further, in one implementation of the present subject matter, the systems and methods transmit implications of legal regulations into requirements that can be leveraged by Software designers and developers in building legally compliant IT System and software.

In one implementation of the present subject matter, the interpretation of the legal regulations may be based on a regulatory rule model. The regulatory rule model may automate the interpretation of the legal regulations by deconstructing legal regulations. In one implementation, deconstruction may be based on identifying one or more of regulatory adjuvant, rule intents, rule intent patterns, legal registers and rule acts corresponding to the legal regulations. A regulatory adjuvant can be understood as an integral part of a legal regulation that affects the implication of the legal regulation. Although regulatory adjuvant may not be an intended constraint in the legal regulation, but may be utilized for interpreting the legal regulation completely. Further, a regulatory adjuvant may be classified into one of an amendment, an applicability, a definition, and a reference.

Rule intents may be understood as atomic constraint embedded in a natural language statements of a legal regulation. In one implementation, the rule intents may either be domain-agnostic and may be generic in nature, such as an actor, a temporal constraint, and a threshold, or may also be domain-specific and may apply to particular domains, such as insured item from insurance domain, health measure from healthcare domain and network medium from security domain. Similarly, rule intent patterns can be understood as syntactic representations of phrases and keywords associated with rule intents in statements of legal regulations.

Rule acts can be understood as a cluster of frequently co-occurring rule intents. Rule acts may explicate implementation specifics, such as access control, data validation, and conditional execution. For example, for a legal regulation: 'For the Family plan, the loss-claim should be submitted within 90 days from the date of the incident', the rule intents, namely the temporal constraint, the threshold and the activity, co-occur. In one implementation, all rule intents with similar rule intents can be combined and a rule act may be defined.

Therefore, based on implementation of the regulatory rule model and identification of one or more of the regulatory adjuvant(s), the rule intents, the rule intent patterns, legal registers and rule acts, legal regulations may be deconstructed and interpreted such that automated understanding of constraints that the legal regulations intend to enforce can be accomplished.

In another implementation of the present subject matter, the interpretation of the legal regulations may be based on Minsky's frames. It would be appreciated by a person ordinarily skilled in the domain that Minsky's frames is a data structure that can be used for representation of information pertaining to legal regulations in slots provided by the data structures and thereby, allows a system to recognize specific instances of patterns in presented data. The Minsky's frames may be utilized to structure regulatory statements and laws of different jurisdictions such that the laws are automatically interpreted by the system in terms of validations to implement.

Hence, based on the above described techniques of regulatory rule model or Minsky's frames, legal regulations may be deconstructed and rule acts may be formed. The deconstructed legal regulations may be stored into a database to form a computer interpretable regulation repository. Such a repository may then be utilized to interpret new legal regulations and their classification into one or more rule acts.

In one example, to interpret a new legal regulation, the legal regulation may be deconstructed and analyzed. Such a deconstruction may either be based on implementation of regulatory rule model, or may be based on implementation of Minsky's frames. The deconstructed legal regulations may then be compared with the regulations pre-stored in the computer interpretable regulation repository to identify a closest possible interpretation. For the sake of explanation, the closest possible interpretation(s) have been referred to as potential interpretation(s), hereinafter. Based on the identification of the potential interpretations, the translation of the legal regulation may be accomplished.

According to an implementation of the present subject matter, traces between legal regulatory statements and software requirements may also be identified. As described above, based on deconstruction and classification of legal regulation into one or more rule acts, a computer interpretable regulation repository may be created. In one implementation, software requirements may be analyzed and if the software requirements are found to contain instances of elements which are common with legal regulations stored within the repository, a trace may be identified. In an implementation, the identified trace between interpreted legal regulations and the software requirements may be annotated onto the requirements with regulation's interpretations.

Therefore, the implementation of the described systems and methods may not only allow automated interpretation of legal regulations, but also allow traceability between software requirements and the applicable legal regulations. Further, the traces may not only associate relevant legal regulations with software requirements, they may also annotate interpretations of these relevant legal regulations along with the software requirements.

The manner in which the described methods and systems are implemented to enable automated determination of legal regulations has been explained in details with respect to the following figure(s). While aspects of described systems and methods can be implemented in any number of different computing systems, transmission environments, and/or configurations, the implementations are described in the context of the following exemplary system(s).

It should be noted that the description merely illustrates the principles of the present subject matter. It will thus be appreciated that those skilled in the art will be able to devise various arrangements that, although not explicitly described herein, embody the principles of the present subject matter and are included within its scope. Moreover, all statements herein reciting principles, aspects, and implementations of the present subject matter, as well as specific examples thereof, are intended to encompass equivalents thereof. Devices that can implement the disclosed method(s) include, but are not limited to, desktop computers, hand-held devices, multiprocessor systems, microprocessor based programmable consumer electronics, laptops, network computers, minicomputers, mainframe computers, and the like.

FIG. 1 illustrates a network environment 100 implementing regulation interpretation system 102, hereinafter referred to as system 102, in accordance with an implementation of the present subject matter. In one implementation, the network environment 100 can be a public network environment, including a large number of personal computers, laptops, mobile phones, recorders, various servers, and other computing and communicating devices. In another implementation, the network environment 100 can be a private network environment with a limited number of personal computers, servers, laptops, mobile phones, and other computing devices. In yet another implementation, the environment 100 may be a combination of a private and a public network.

The system 102 may be communicatively coupled to a plurality of user devices 104-1, 104-2, . . . , 104-N, collectively referred to as the user devices 104 and individually referred to as a user device 104, through a network 106. The system 102 and the user devices 104 may be implemented as any of a variety of conventional computing devices, including, servers, a desktop personal computer, a notebook or portable computer, a workstation, a mainframe computer, a mobile computing device, and a laptop. Further, in one implementation, the system 102 may itself be a distributed or centralized network system in which different computing devices may host one or more of the hardware or software components of the system 102. In another implementation, the various components of the system 102 may be implemented as a part of the same computing device.

The system 102 is connected to the user devices 104 over the network 106 through one or more communication links. The communication links between the system 102 and the user devices 104 are enabled through a desired form of communication, for example, via dial-up modem connections, cable links, digital subscriber lines (DSL), wireless or satellite links, or any other suitable form of communication.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the system 102 and the user devices 104. The network devices within the network 106 may interact with the system 102 and the user devices 104 through the communication links.

In one embodiment, the system 102 is associated with a computer interpretable regulation repository 108, which stores deconstructed legal regulations. Although the computer interpretable legal regulation repository 108 is illustrated external to the system 102, it will be understood that the interpretable legal regulation repository 108 may be internal to the system 102 as well. Further, the computer interpretable legal regulation repository 108 can be implemented as, for example, a single repository, a distributed repository or a collection of distributed repositories.

In an implementation, to develop the computer interpretable legal regulation repository 108, different legal regulations may be collected from different geographic locations. Such legal regulations may represent different styles and forms of legal regulations. For example, the legal regulation corresponding to financial transactions may be different from legal regulations corresponding to insurance requirements. It would be understood by those skilled in the art that the data may be collected from various sources to make the interpretable legal regulation repository 108 more effective.

The system 102, according to an implementation of the present subject matter, may create the interpretable legal regulation repository 108. The system 102 may also interpret new legal regulations based on the comparison of the mew legal regulations with those stored in the interpretable legal regulation repository 108. The system 102 may also analyze software requirements to trace applicable legal regulations to such software requirements.

To this end, the system 102 includes one or more processor(s) 109, interfaces 110, and a memory 112 coupled to the processor(s) 109. The processor(s) 109 may be implemented as one or more microprocessors, microcomputers, microcontrollers, digital signal processors, central processing units, state machines, logic circuitries, and/or any devices that manipulate signals based on operational instructions. Among other capabilities, the processor(s) 109 are configured to fetch and execute computer-readable instructions and data stored in the memory 112.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 110 may include a variety of software and hardware interfaces, for example, interface for peripheral device(s), such as a keyboard, a mouse, a microphone, an external memory, a speaker, and a printer. Further, the interface(s) 110 may enable the system 102 to communicate over the network 106, and may include one or more ports for connecting the system 102 with other computing devices, such as web servers and external databases. The interface(s) 110 may facilitate multiple communications within a wide variety of protocols and networks, such as a network, including wired networks, e.g., LAN, cable, etc., and wireless networks, e.g., WLAN, cellular, satellite, etc.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules 114 may include routines, programs, objects, components, data structures, etc., which perform particular tasks or implement particular abstract data types. In another aspect of the present subject matter, the modules 114 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The modules 114 may include a deconstructing module 118, an analysis module 120, a classification module 122, a traceability module 124 and other modules 126. The other modules 126 may include programs or coded instructions that supplement applications and functions on the system 102, for example, programs in the operating system.

The data 116, amongst other things, serves as a repository for storing data processed, received, and generated by one or more of the modules 114. The data 116 may include legal regulation data 128, rule act data 130, rule intent data 132 and other data 134. The other data 134 may include data generated as a result of the execution of one or more modules in the other modules 126.

Although, the data 116 has been illustrated internal to the system 102; however, it will be understood that the data 116 may be hosted on external memory device(s) or external computing device(s), such as the interpretable legal regulation repository 108.*de*

In operation, the system 102 may analyze plurality of legal regulations to make them automatically interpretable. In one implementation of the present subject matter, the system 102 may create the interpretable legal regulation repository 108. The system 102 may receive multiple legal regulations from one or more sources. The legal regulations may be deconstructed based on a Regulatory Rule Model (RRM), or based on Minsky's frames.

In one implementation, where the deconstruction of the legal regulation is based on the RRM, the deconstructing module 118 of the system 102 may deconstruct the legal regulations in terms of rule intents, rule intent patterns, legal registers and regulatory adjuvants. As described earlier, a rule intent can be understood as an atomic constraint embedded in a natural language of the legal regulation. For example a legal regulation may include constraints, such as actors, temporal constraints, and threshold values. Such constraints may be identified as rule intents of that legal regulation.

Similarly, a regulatory adjuvant is a part of a regulation that may change the implication of the legal regulation. The regulatory adjuvant may not be an intended constraint of the legal regulation, but may be crucial to be captured for interpreting the regulation completely.

In one implementation, the deconstructing module 118 may identify one of the four types of regulatory adjuvants. That is, first may be where an amendment is the information related to modifications or updates which need to be considered within the context of a legal regulation. For example, 'A policyholder may submit claims electronically as per this regulation amended on Nov. 1, 2011'. Such adjuvant may be referred to as an amendment adjuvant.

Second may be where applicability is the information which mentions the criteria or scope and the time when the regulation comes into effect. For example, 'Become effective for all claims submitted for payment on or after Nov. 1, 2012'. Such adjuvant may be referred to as an applicability adjuvant.

Third can be where definition is the information which explains the meaning of a term in a specific context referred by a regulation. For example, 'replacement of a contract of life insurance' means any transaction in which life insurance is to be purchased in a single contract or in more than one related contract by a person from an insurer and, as a consequence of the transaction, any existing contracts of life insurance have been or are to be rescinded, lapsed or surrendered'. Such adjuvant may be referred to as a definition adjuvant.

And fourth may be where reference is information that points to the sources of additional information required to understand a regulation. For example, 'Under section 2002 (d) of the Social Security Act (42 U.S.C. 1397a (d (3)'. Such adjuvant may be referred to as a reference adjuvant.

Therefore, the deconstructing module 118 may deconstruct the legal regulations to identify applicable rule intents and rule adjuvants. The deconstructing module 118 may also identify rule intent patterns associated with the legal regulations. As described earlier, the rule intent patterns can be understood as syntactic representations of phrases and keywords associated with rule intents in a legal regulation. The rule intent pattern may be a combination of Parts of Speech (POS) tags, keywords and wild card characters. Wild characters may include, but not limited to, '*', '+', and '.', where '*' may represent 0 or more occurrence of words, '+' may represent 1 or more occurrence of words and '.' may represent exactly 1 occurrence of word.

For example, the legal regulation: 'In accordance with the procedures established pursuant to paragraph 3, for the Family plan, the loss-claim should be submitted within 90 days from the date of the incident' may be represented by the following Rule intent patterns:

i. For the family plan, (+NNP*plan*)
ii. Loss claim should be submitted (*claim+MD VB+VBN*)
iii. Within 90 days (*within CD days*)
iv. From the date of the incident (*from+date of+NN*)

It would be appreciated that the POS tags, such as the 'NNP', 'MD', 'VB', 'VBN', 'CD', and 'NN' may represent known syntactic, such as Proper noun, modal, verb—base form, verb—past participle, cardinal number, and noun, respectively. Further, for different legal regulations, such different POS tags, wild cards, and keywords may be utilized by the deconstructing module 118 to identify rule intent patterns corresponding to the legal regulations.

In one implementation, the rule intent patterns may be represented in forms of legal registers. Legal registers may include keywords and phrases from the legal terminology. For example, for the above identified legal regulation: 'In accordance with the procedures established pursuant to paragraph 3, for the Family plan, the loss-claim should be submitted within 90 days from the date of the incident', a rule intent pattern may also include legal registers:

v. In accordance with the (IN accordance with+NNS*)
vi. Procedures established pursuant to paragraph 3 (*Pursuant to NN*)

In an implementation of the present subject matter, the deconstructing module 118 may deconstruct the legal regulations by parsing them and then matching the rule intent patterns corresponding to rule intents against the parsed legal regulation and its POS structure. The deconstructed legal regulations, along with corresponding rule intents may then be stored in the computer interpretable legal regulation repository 108. For the sake of explanation, the computer interpretable legal regulation repository 108 has also been interchangeably referred to as a rule repository, hereinafter.

According to an implementation of the present subject matter, the analysis module 120 of the system 102 may identify rule acts corresponding to the different deconstructed legal regulations. For instance, the analysis module 120 may takes as input, the deconstructed legal regulations and their corresponding rule intents to generate the clusters of most frequently co-occurring rule intents.

It would be appreciated by a person ordinarily skilled in the domain, that the analysis module 120 may run any known clustering algorithm, such as an agglomerative clustering algorithm, over the deconstructed legal regulations, to identify rule intents that co-occur most frequently. These groups or clusters may then be analyzed to form rule acts. Therefore, rule acts can be understood as cluster of frequently co-occurring Rule intents.

For example, in a legal regulation, 'For the Family plan, the loss-claim should be submitted within 90 days from the date of the incident', the rule intents temporal constraint, threshold and activity may co-occur. The analysis module 120 may identify legal regulations where same cluster of rule intents may co-occur and wherein a notion of some deadline on a given business activity is present. In one implementation, such cluster of legal regulations may be identified as a rule act 'deadline'. In other words, the rule act 'deadline' may be constituted of three rule intents, which restricts the time duration or specifies a date.

Therefore, the multiple deconstructed legal regulations may be analyzed to form one or more clusters, and may be defined as one or more rule acts, where each rule act may be formed based on frequent occurrence of common rule intents. In one implementation, naming of the clusters formed by the analysis module 120 may be done manually, such as an administrator or a configurations team. It would be appreciated that a name for a particular rule act may merely signify the applicability of the rule act and may not be utilized by the components of the system 102 for automatically interpreting of the legal regulations.

In one implementation of the present subject matter, the analysis module 120 may also store the rule acts into the computer interpretable legal regulation repository 108 or the rule repository. It would be appreciated that the system 102 may either create the computer interpretable legal regulation repository 108 based on analysis of the multiple legal regulations, or may directly access the computer interpretable legal regulation repository 108 created by another system.

The computer interpretable legal regulation repository 108 may also be accessed by one or more systems, such as the system 102, in a distributed computing environment, such that each system can utilize the interpretable legal regulation repository 108 for analysis and processing.

In another implementation of the present subject matter, the system 102 may also receive new legal regulations for the purpose of interpretation. In such situation, the system 102 may interpret the new legal regulation in terms of implementation specifics, or the rule acts. To this end, the deconstructing module 118 of the system 102 may deconstruct the new legal regulation, and may identify at least one of regulatory adjuvants, rule intents, legal registers and rule intent patterns associated with the new legal regulation.

Further, the classification module 122 may compare the rule intents of the new legal regulation with the rule intents of different rule acts present in the computer interpretable legal regulation repository 108, or the rule repository. In operation, the comparison may be done to determine if the new legal regulation contains a primary rule intent corresponding to a given rule act. If it does, then the classification module 122 may detect the number of common rule intents between the legal regulation and the rule act.

In one implementation, the classification module 122 may compute a relevance score for each rule act with which the rule intents of the new legal regulation are compared with. The relevance score may be indicative of the number of common Rule intents between the new legal regulation and the compared rule act. In said implementation, the classification module 122 may compare the rule intents of the new legal regulation with all possible rule acts and may correspondingly generate relevance scores corresponding to all possible rule acts, based on the number of common rule intents detected. It would be appreciated that higher the number of common rule intents between the new legal regulation and the compared rule act, higher may be the relevance score.

The classification module 122, upon computation of the relevance score corresponding to all the rule acts, may compare the relevance scores to a predetermined threshold to identify all potential applicable rule acts. The potential applicable rule acts may therefore define the potential interpretation of the new legal regulation. Hence, the system 102 may interpret legal regulations based on a least one of regulatory adjuvants, rule intents, legal registers, rule intent patterns, and rule acts.

The system 102 may also identify traces between interpreted legal regulations and software requirements. The system 102 may also annotate the software requirements with interpreted legal regulations to allow easy reference to legal regulations while analyzing the software requirements.

In one implementation, the system 102 may involve a two-phase mechanism to identify the traces between legal regulations and the software requirements. In the first phase, the system 102 may represent the legal regulations and the software requirements in terms of RRM elements based on identification of rule acts, rule intents and rule intent patterns. It would be appreciated that the classification of the legal regulations and the software requirements in the RRM model may be done by deconstructing the legal regulations and the software requirements by the deconstructing module 118. The traceability module 124 of the system 102 may then compare the software requirements with the legal regulations to identify any applicable traces.

In an example implementation, the deconstructing module 124 may compare the rule intents identified corresponding to the software requirements to the rule intents of the legal regulations. It would be appreciated that the deconstructing module 124 may either utilize legal regulations deconstructed while analyzing the software requirements, or may utilize the already deconstructed and stored legal regulations from the computer interpretable legal regulation repository 108.

If a software requirement is found to contain instances of RRM elements common with RRM elements of the legal regulation, the traceability module 118 may consider it as a potential trace. In operation, the identification of common elements between the software requirements and the legal regulations may be done based on computation of a similarity score between the software requirement and the potential trace.

In one implementation, the deconstructing module 124 may compute the similarity score as follows:

$$Similarity_{i,j} = \frac{\sum_{r=1}^{R} RI_{i,j}}{R} + \frac{\sum_{p=1}^{P} RP_{i,j}}{P} \quad \text{Equation (1)}$$

Where, $Similarity_{i,j}$ is a similarity score between legal regulation 'i' and software requirement 'j'. Further, $RI_{i,j}$ is a binary function that returns '1' if rule intent 'r' is common among the legal regulation 'i' and the software requirement 'j'. R may represent the total number of rule intents and $RP_{i,j}$ may be a binary function that returns 1 if rule intent pattern 'p' is common among the legal regulation 'i' and the software requirement 'j'. Furthermore, $\Sigma^P_{p=1} RI_{i,j}$ may be the total number of common rule intent patterns between the legal regulation 'i' and the software requirement 'j', and P is the total number of rule intent patterns associations.

The traceability module 124 may also compare the similarity score with a threshold value to identify a trace between the legal regulations and the software requirements. The threshold value may be empirically such that the traces between the legal regulations and the software requirements are accurately identified by the traceability module 124.

Figure 2:
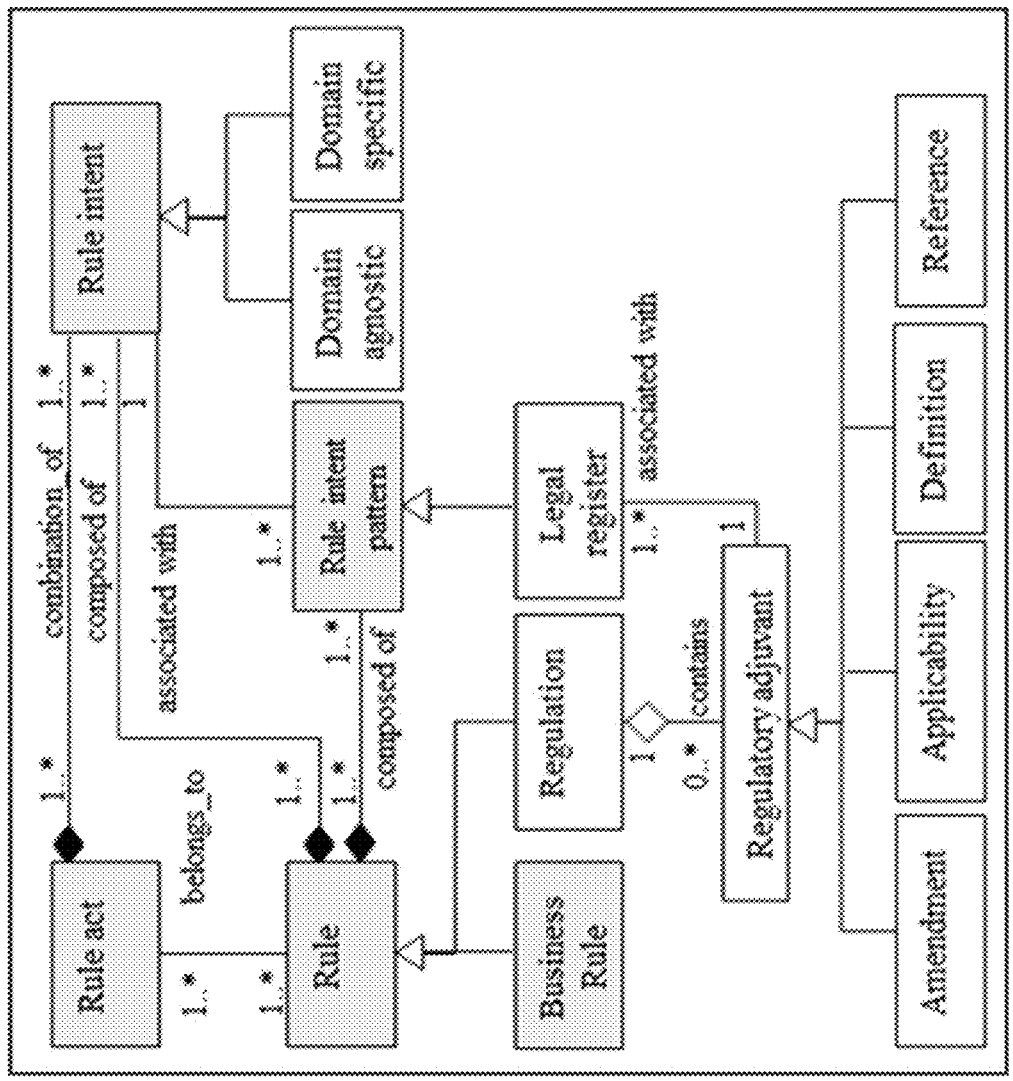
FIG. 2 illustrates a class diagram of a regulatory rule model, according to an exemplary implementation of the present subject matter.

In one implementation, a class diagram of the computer interpretable legal regulation repository 108 is depicted in the FIG. 2. As shown in the FIG. 2, the legal regulations, rule intents, rule intent patterns, and the regulatory adjuvants are included in the computer interpretable legal regulation repository 108, and their associations with one another are shown in the form of a class diagram is depicted.

Figure 3:
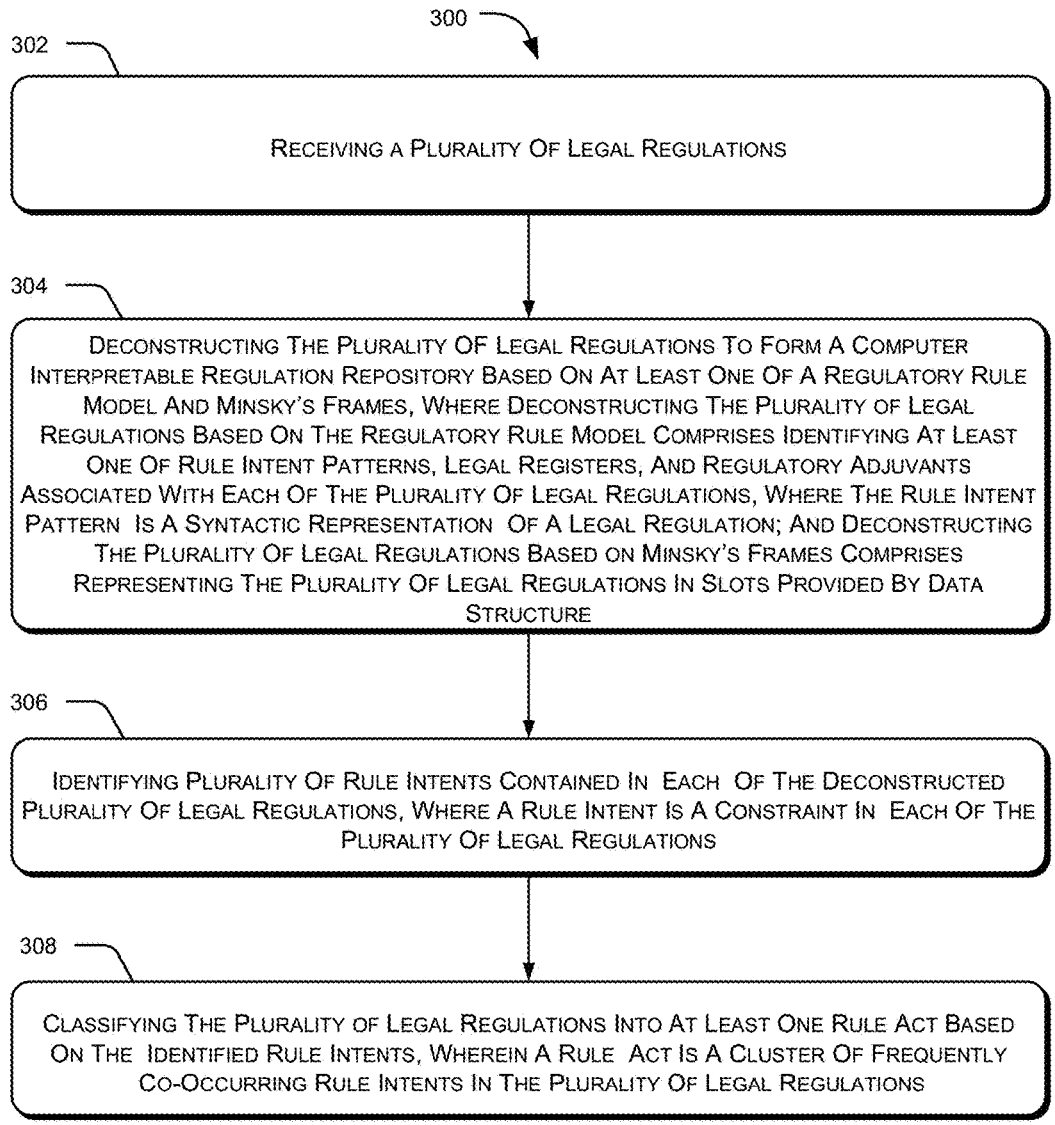
FIG. 3 illustrates a method for automated interpretation of legal regulations, according to an implementation of the present subject matter.

FIG. 3 illustrates a method 300 for automated interpretation of legal regulations, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Further, although the method 300 may be implemented in a variety of computing systems of a computing environment; in an embodiment described in FIG. 3, the method 300 is explained in context of the aforementioned system 102, for ease of explanation.

At block 302, a plurality of legal regulations may be received. The legal regulations may be from different domains, such as healthcare and insurance; and may represent different legal constraints. In one implementation, the legal regulations may be form different jurisdictions, representing various forms and types of legal regulations.

At block 304, the plurality of legal regulations may be deconstructed based on at least one of a regulatory rule model (RRM) and Minsky's frames. In one implementation, the deconstruction of the legal regulations based on the RRM may include identification of at least rule intents corresponding to each of the legal regulations, as described at block 306. The deconstruction of the legal regulations based on RRM may also include identification of regulatory adjuvants, legal registers and rule intent patterns corresponding to the legal regulations to allow identification of constraints in the legal regulations in a machine identifiable form, such as POS tags, keywords, and wild cards.

At block 308, the plurality of legal regulations may be classified into at least one rule act based on the rule intents. As described earlier, the rule act may be understood as a cluster of frequently co-occurring rule intents which define a similar constraint. In one implementation, the classification of the legal regulations into one or more rule acts may allow their automated interpretation as rule acts may define implementation specifics.

Although implementations of present subject matter have been described in language specific to structural features and/or methods, it is to be understood that the present subject matter is not necessarily limited to the specific features or methods described. Rather, the specific features and methods are disclosed and explained in the context of a few implementations for the present subject matter.

We claim:

1. A computer implemented method for interpreting legal regulations, the method comprising:
    receiving a plurality of legal regulations;
    deconstructing the plurality of legal regulations to form a computer interpretable regulation repository based on at least one of a regulatory rule model and Minsky's frames, wherein deconstructing the plurality of legal regulations based on the regulatory rule model comprises identifying at least one of rule intent patterns, legal registers, and regulatory adjuvants associated with each of the plurality of legal regulations, wherein the rule intent pattern is a syntactic representation of a legal regulation; and deconstructing the plurality of legal regulations based on Minsky's frames comprises representing the plurality of legal regulations in slots provided by Minsky's frames;
    identifying plurality of rule intents contained in each of the deconstructed plurality of legal regulations, wherein a rule intent is a constraint in each of the plurality of legal regulations; and
    classifying the plurality of legal regulations into at least one rule act based on the identified rule intents, wherein a rule act is a cluster of frequently co-occurring rule intents in the plurality of legal regulations.

2. The computer implemented method as claimed in claim 1, wherein the identifying of the rule intent patterns is based on determination of at least one of Part of Speech (POS) tags, keywords, and wildcard characters, and wherein the identifying of the regulatory adjuvants includes determination of at least one of an amendment adjuvant, an applicability adjuvant, a definition adjuvant, and a reference adjuvant.

3. The computer implemented method as claimed in claim 1, wherein the method further comprises:
    receiving a legal regulation for interpretation;
    deconstructing the legal regulation based on at least one of the regulatory rule model and Minsky's frames;
    identifying rule intents contained in the legal regulation based on at least one of the rule intent patterns, the legal registers and the regulatory adjuvants associated with the legal regulation;
    comparing the rule intents contained in each of the plurality of legal regulations with the rule intent clusters in the computer interpretable regulation repository to generate relevance scores, wherein each relevance score is indicative of commonality of rule intents of the legal regulation and each of the legal regulation within the computer interpretable regulation repository; and classifying the legal regulation into the at least one rule act based on the relevance scores.

4. The computer implemented method as claimed in claim 3, wherein the relevance scores are generated based on rule intents identified to be common between the received legal regulation and those in the computer interpretable regulations repository.

5. The computer implemented method as claimed in claim 1, wherein the method further comprises:
   receiving at least one software requirement;
   deconstructing the at least one software requirement based on at least one of a regulatory rule model and Minsky's frames;
   identifying rule intents contained in the at least one software requirement based on rule intent patterns contained in at least one software requirement;
   comparing the rule intents contained in the at least one software requirement with the rule intents contained in the legal regulations within the computer interpretable regulation repository; and
   tracing at least one legal regulation from amongst the computer interpretable regulation repository to the at least one software requirement based on the comparing.

6. The computer implemented method as claimed in claim 5, wherein the comparing generates similarity scores, and wherein each similarity score is indicative of commonality of rule intents between each of the at least one software requirement and each legal regulation within the computer interpretable regulation repository.

7. A regulation interpretation system for interpreting legal regulations, comprising:
   a processor;
   a deconstructing module coupled to the processor is to:
     receive a plurality of legal regulations; and
     deconstruct the plurality of legal regulations to form a computer interpretable regulation repository based on at least one of a regulatory rule model and Minsky's frames, wherein deconstructing the plurality of legal regulations based on the regulatory rule model comprises identifying at least one of rule intent patterns, legal registers, and regulatory adjuvants associated with each of the plurality of legal regulations, wherein the rule intent pattern is a syntactic representation of a legal regulation; and deconstructing the plurality of legal regulations based on Minsky's frames comprises representing the plurality of legal regulations in slots provided by Minsky's frames;
   an analysis module coupled to the processor is to identify plurality of rule intents contained in each of the plurality of deconstructed legal regulations, wherein a rule intent is a constraint in any legal regulation; and
   a classification module coupled to the processor is to classify the plurality of legal regulations into at least one rule act based on the identified rule intents, wherein a rule act is a cluster of frequently co-occurring rule intents in the plurality of legal regulations.

8. The regulation interpretation system as claimed in claim 7, wherein the deconstructing module identifies the rule intent patterns based on determination of at least one of Part of Speech (POS) tags, keywords, and wildcard characters, and wherein the deconstructing module identifying of the regulatory adjuvants is based on determination of at least one of an amendment, an applicability, a definition, and a reference.

9. The regulation interpretation system as claimed in claim 7, wherein:
   the deconstructing module is to further:
     receive a legal regulation for interpretation; and
     deconstruct the legal regulation based on at least one of a regulatory rule model and Minsky's frames;
   the analysis module is to further:
     identify rule intents applicable to the legal regulation based on at least one of rule intent patterns, legal registers and regulatory adjuvants associated with the legal regulation;
     comparing the rule intents contained in each of the plurality of legal regulations with the rule intent clusters in the computer interpretable regulation repository to generate relevance scores, wherein each relevance score is indicative of commonality of rule intents of the legal regulation and each of the legal regulation within the computer interpretable regulation repository; and
   the classification module is to further classify the legal regulation into the at least one rule act based on the relevance scores.

10. The regulation interpretation system as claimed in claim 7, wherein the deconstructing module is to further:
    receive at least one software requirement; and
    deconstruct the at least one software requirement based on at least one of a regulatory rule model and Minsky's frames;
    the analysis module is to further:
      identify rule intents applicable to the at least one software requirement based on the rule intent patterns contained in the at least one software requirement;
      compare the rule intents contained in the at least one software requirement with the rule intents contained in the legal regulations within the computer interpretable regulation repository; and
    a traceability module to trace at least one legal regulation from amongst the computer interpretable regulation repository to the at least one software requirement based on the comparing.

11. The regulation interpretation system as claimed in claim 10, wherein the traceability module generates similarity scores upon comparing, and wherein each similarity score is indicative of commonality of rule intents between each of the at least one software requirement and each legal regulation within the computer interpretable regulation repository.

12. The regulation interpretation system as claimed in claim 10, wherein the traceability module further annotates the at least one software requirement to the applicable at least one legal regulation.

13. A non-transitory computer-readable medium comprising instructions for interpreting legal regulations to executable by a processor resource to:
    receive a plurality of legal regulations;
    deconstruct the plurality of legal regulations to form a computer interpretable regulation repository based on at least one of a regulatory rule model and Minsky's frames, wherein deconstructing the plurality of legal regulations based on the regulatory rule model comprises identifying at least one of rule intent patterns, legal registers, and regulatory adjuvants associated with each of the plurality of legal regulations, wherein the rule intent pattern is a syntactic representation of a legal regulation; and deconstructing the plurality of legal regulations based on Minsky's frames comprises representing the plurality of legal regulations in slots provided by Minsky's frames;

identify plurality of rule intents contained in each of the deconstructed plurality of legal regulations, wherein a rule intent is a constraint in each of the plurality of legal regulations; and classify the plurality of legal regulations into at least one rule act based on the identified rule intents, wherein a rule act is a cluster of frequently co-occurring rule intents in the plurality of legal regulations.

14. The non-transitory computer-readable medium as claimed in claim 13, wherein the instructions are to further:

receive at least one software requirement;

deconstruct the at least one software requirement based on at least one of a regulatory rule model and Minsky's frames;

identify rule intents contained in the at least one software requirement based on rule intent patterns contained in the at least one software requirement;

compare the rule intents contained in the at least one software requirement with the rule intents contained in the legal regulations within the computer interpretable regulation repository; and trace at least one legal regulation from amongst the computer interpretable regulation repository to the at least one software requirement based on the comparing.

* * * * *